United States Patent [19]
Soane

[11] Patent Number: 5,110,514
[45] Date of Patent: May 5, 1992

[54] CONTROLLED CASTING OF A SHRINKABLE MATERIAL

[75] Inventor: David S. Soane, Piedmont, Calif.

[73] Assignee: Soane Technologies, Inc., Livermore, Calif.

[21] Appl. No.: 345,718

[22] Filed: May 1, 1989

[51] Int. Cl.$^5$ ............ B29C 35/10; B29C 39/02; B29D 11/00
[52] U.S. Cl. .................. 264/22; 264/1.3; 264/1.4; 264/25; 264/327; 264/330; 425/174.4; 425/808
[58] Field of Search .......... 264/1.3, 1.4, 2.1, 22, 264/25, 106, 327, 330; 425/808, 174.4

[56] References Cited

U.S. PATENT DOCUMENTS

| | | | |
|---|---|---|---|
| 3,070,846 | 1/1963 | Schrier | 264/2.2 |
| 4,113,224 | 9/1978 | Clark et al. | 264/1.4 |
| 4,166,088 | 8/1979 | Neefe | 264/22 |
| 4,354,988 | 10/1982 | Bricot et al. | 264/22 |
| 4,534,915 | 8/1985 | Neefe | 264/1.4 |
| 4,812,346 | 3/1989 | Sudo et al. | 264/1.4 |

FOREIGN PATENT DOCUMENTS

| | | |
|---|---|---|
| 226123 | 12/1986 | European Pat. Off. . |
| 0226123 | 6/1987 | European Pat. Off. ............. 264/1.4 |
| 322353 | 12/1988 | European Pat. Off. . |
| 61-248707 | 6/1986 | Japan . |
| 248707 | 11/1986 | Japan .................. 264/1.4 |

OTHER PUBLICATIONS

Modern Plastic Encyclopedia, Oct. 1984, vol. 61, No. 10A, pp. 198, 317-318.
Van Nostrand's Scientific Encyclopedia, 6th Ed. 1983 p. 1904.

*Primary Examiner*—James Lowe
*Attorney, Agent, or Firm*—Kilpatrick & Cody

[57] ABSTRACT

A method and a device are disclosed wherein a shrinkable polymer material is formed in situ in a mold without defects and with no internal stresses. A monomer or polymer solution is injected into the mold and solidified sequentially through the mold by exposure to an agent such as ultraviolet radiation, with simultaneous addition of monomer or polymer solution into the area of the mold not yet exposed to the solidifying agent. By controlling the rate at which the solidifying agent is moved across the mold and the monomer or polymer solution is injected into the mold, the resulting product completely fills the mold and is stressfree.

7 Claims, 4 Drawing Sheets

CONTROLLED CASTING OF A SHRINKABLE MATERIAL

TECHNICAL FIELD

This invention relates to controlled solidification of a pre-polymer mixture in a precisely dimensioned confined space. In particular, it relates to the manufacture in a confined space of precisely dimensioned stress free articles made of polymers either by in situ polymerization or by devolatilization or coagulation of a dissolved polymer mixture

BACKGROUND OF THE INVENTION

The manufacture of molded plastic parts made of polymers can be broadly stated as taking place in two distinct steps. The monomeric material used to make the polymer is usually polymerized separately prior to the shaping stage of the plastic part. There are, of course, exceptions; however generally speaking the polymer, once made, is ground into relatively fine particles or pelletized and then heated to liquefy the polymer or alternatively a solvent is added to dissolve the polymer. Subsequently, the liquefied polymer is either injected into a mold, extruded, spun or in some instances blow molding takes place. There are situations where direct casting is performed; however, in casting, and for that matter in injection molding, there exists an unacceptable degree of shrinkage and flow-induced molecular orientation for the most precisely dimensioned parts. When a solvent is used to liquefy a polymer for later solvent devolatilization in an attempt to obtain stress free geometric shapes, concomitant shrinkage caused by solvent evaporation results in cracks and unacceptable stresses in the hardened polymer.

Similarly, if in situ polymerization is attempted, the pre-polymer reaction mixture or raw material that will make up the polymer may shrink upon polymerization up to 20 percent. Thus, neither in situ polymerization or molding of an already formed polymer has proved successful in manufacture of precision stress free plastic parts. To compound the problem, when the molded part exceeds certain thicknesses, cavitation due to shrinkage will frequently leave unacceptable bubbles in the part. These bubbles are indicative of internal stresses.

Three exemplary fields exist where polymers are appropriate for use; however, the limitations set forth above, that is shrinkage of polymers at mold time or at polymerization time, limits usage of polymers for precision articles. Similarly shrinkage of a dissolved polymer upon devolatilization also limits use of parts formed in this method.

When the article is to be used in an optical application, e.g., a large lens, a second requirement, in addition to precise dimensions, is present. That is, there can exist no internal stresses in the article as internal stresses will result in birefringence. Such is the case in injection molding of large plastic lenses and injection molding of optical or magnetic data storage discs currently used in compact disc recorders and personal computers and anticipated as being used as storage media for data in other computer systems. Both these products are now injection molded; however, both with the above restrictions. In the case of the lenses, it is common to utilize a glass blank of a size somewhat smaller, but generally conforming to the lens curvature desired in the final product. In this instance the monomer is polymerized about the glass blank in a relatively thin film. However, blanket exposure of the entire lens leaves bubbles and internal stresses that would occur anywhere but more frequently in narrow spaces. These defects appear often in the center or the thickest part of the lenses if the lenses were made entirely of the plastic material. The present invention addresses such problems in both types of construction.

In the case of the disc, injection molding generally results in some flow-induced and thermoplastic internal stresses. Such stresses cause birefringence and thus the storage capacity and data detection reliability of the disc are limited.

In the third example, a liquefied polymer sheet, when cast onto a flat or curved support will warp or crack if allowed to devolatilize or coagulate over the entire surface simultaneously. Such warping or cracking is caused by shrinkage due to solvent loss.

This invention discloses a method for in situ formation of precisely dimensioned precision parts made of polymers either by in situ polymerization or differential devolatilization or coagulation.

It is an object of this invention to provide a method that permits in situ molding of parts formed of polymers without internal stresses.

It is also an object of this invention to provide a method that permits differential polymerization in a precision mold thereby eliminating voids caused by shrinkage.

It is a further object of this invention to provide a method of casting a polymer sheet by devolatilization or coagulation that avoids surface cracking of the film.

It is also an object of this invention to provide a method that permits in situ polymerization of relatively thick and large precision parts without internal bubbles.

It is still another object of this invention to provide a method that permits casting of precision polymer parts with widely varying thicknesses.

It is a object of this invention to provide an method for differential polymerization of variable thickness precision parts.

SUMMARY OF THE INVENTION

This invention is a method for forming an article of precise dimensions by in situ solidification in a precisely dimensioned mold of a liquefied material that upon exposure to a solidifier shrinks.

The method comprises the steps of providing a mold body having a first closed end and a second open end and defining an internal cavity corresponding to the precise dimensions of the finished article. The mold body is so formed that it may be differentially exposed to a solidifier starting at the first closed end and moving in a controlled manner to the second open end. The method also includes the step of providing a source of the solidifier for imposition upon the liquefied material within the mold body. It also includes the step of providing a constant source of liquefied material at the open end of the mold body. Finally, it includes the step of differentially exposing the liquefied material to the solidifier starting at the closed end and proceeding to the open end while continuously supplying liquefied material to the open end. The invention also includes a device for forming an article of a material that upon exposure to a solidifier shrinks The device comprises a mold body defining an internal cavity having a portion of the mold body so formed that the internal cavity is differentially exposeable to a solidifier, the mold body having a first end and a second end with the internal cavity conforming to the desired outer dimensions of the article, the mold body further includes a gate at the second end of the cavity, the gate communicating with the cavity. The device also includes a source for the solidifier and means for focusing the solidifier upon a selected area of the material such that it is imposed differentially upon the material in the internal cavity. Means are also provided for moving the solidifier imposed upon the material in the internal cavity relative the internal cavity from the first end to the second end at a controlled velocity.

DETAILED DESCRIPTION OF THE PREFERRED EMBODIMENT

Figures 1, 2:
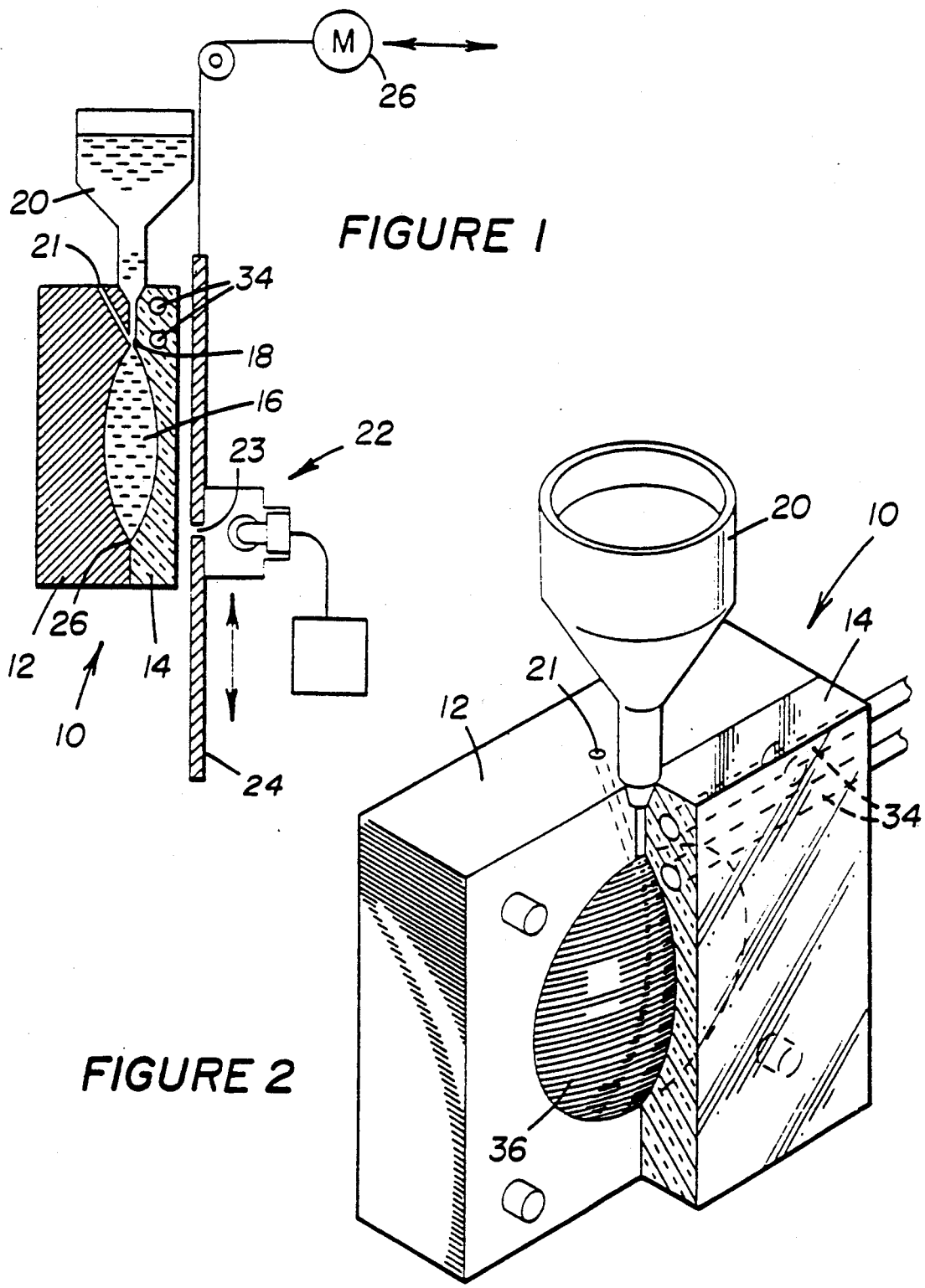
FIG. 1 is a cross sectional view of a device capable of differential exposure of a solidifier to a mold body.
FIG. 2 is a perspective view of the mold shown in FIG. 1 with the solidifier removed.

Referring to FIG. 1 a mold body 10 is shown in cross-section. The mold body as shown in FIG. 1 is designed specifically for a lens shaped precision article such as a projection lens for a television receiver. The device 10 shown in FIG. 1 is formed of at least two parts 12 and 14, brought together to form a cavity 16. Cavity 16 is formed having the shape of the precision body that is desired to be molded. As is usual with a mold, a gate 18 provides access to the mold body 10 when the first and second part are engaged. Communicating with gate 18 is a reservoir 20 which is utilized to feed raw material to cavity 16 through gate 18. Reservoir 20 is represented in FIG. 1 as a hopper-like device. A vent 21 (see FIG. 2) may also be included to facilitate the filling of cavity 16. It should be understood that other means for providing raw material to cavity 16 through gate 18 may be advantageously used. For example, it may be appropriate to provide raw material to cavity 16 under pressure.

Mold body 10, as can be seen in FIG. 1, necessarily has one part, in the case illustrated, part 14, that is transparent to a source of energy. A source of energy 22 is movable relative to mold body 10 and includes a focusing means such as gate 24. The source of energy 22 may be drawn across the second part 14 by means of a two-way motor 26. Source of energy 22 is selected according to the material to be molded. For example, if the monomers (sometimes referred to as the reaction mixture or polymer precursor) provided to the mold cavity 16 from reservoir 20 are to be polymerized by heat, then source of energy 22 is appropriately a heat source which is focused through an opening 23 in focusing gate 24. Opening 23 is preferably designed to focus a plane of energy on second part 14. The plane of energy is substantially normal to the movement of focusing gate 24. Alternatively if the monomers utilized in cavity 16 are polymerized by an ultra violet source or other light source, then source of energy 22 may be a light of the proper wave length. Again, second part 14 is of necessity transparent to the wave length of light utilized in source of energy 22 in the event polymerization takes place under the imposition of a light source. In the event that polymerization takes place as a result of the imposition of heat, second part 14 is appropriately thin and made of material that has little or no insulative qualities. It may also include passages 34 for cooling. These passages, as will be seen, may be selectively used so that a time-dependent temperature gradient will be maintained. Similar passages may be symmetrically located in part 12 (not shown).

Important to the invention is the fact that solidification of the liquefied material in cavity 16, be it monomers that are to be polymerized or a polymer which has been liquefied by a solvent is the differential exposure of the material in cavity 16 to the solidifier. In the case of the polymerization, the solidifier is the source of energy 22, while in the case of devolatilization or coagulation of a dissolved liquefied polymer mixture, best illustrated in FIG. 5, the ambient-controlled atmosphere or a non-solvent extraction bath is the solidifier with exposure of the material in cavity 16' to the atmosphere done by removal of the second part 14' from the first part 12' of the mold body 10'. More will be said about the alternate embodiment in the ensuing discussion.

Figure 4:
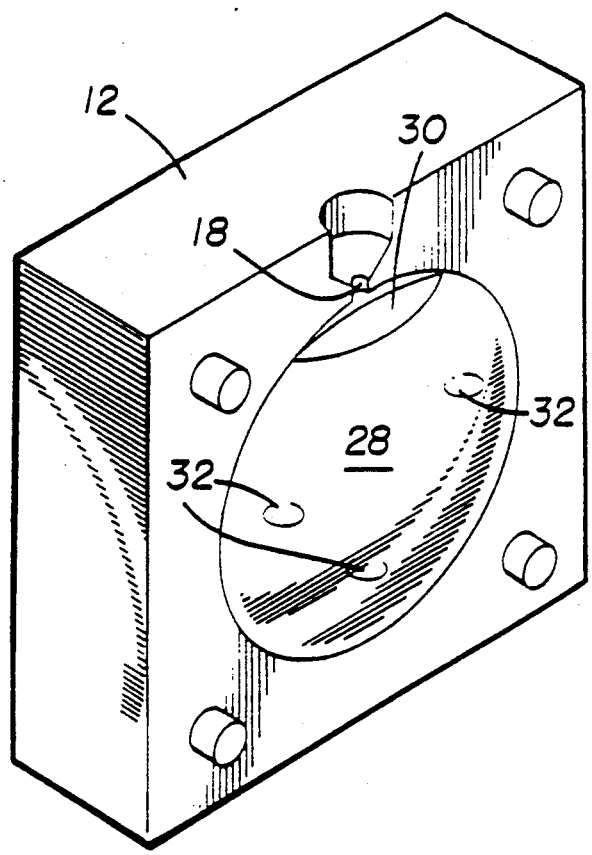
FIG. 4 is an illustration of a portion of a mold body wherein polymerization takes place across the entire molded body at one time.

Returning now to FIG. 1, movement of focusing gate 24 relative to mold body 10 is controlled so that source of energy 22 scans across the mold body 10 starting at the closed end 26 of cavity 16 and moving toward gate 18. Should cavity 16 be exposed to a source of energy 22 across the entire surface, which is the normal process in polymerization, there would be severe shrinkage in the mold body and a strong likelihood that bubbles would form in the formed polymer especially in highly stressed portions. Reference is made to FIG. 4 wherein an example is shown of what would occur with simultaneous polymerization within the mold body. It is to be understood that second part 12 has been removed in FIG. 4 and the molded form 28 is shown with a void 30 at its upper end adjacent to gate 18. Additionally, bubbles 32 formed by cavitation during polymerization also may very likely occur in the molded body 28. The voids 30 and bubbles 32 are attributable to the chemical linkage formation during polymerization. In order to avoid these problems, it has been found that providing a continuous source of monomer or reaction mixture to be polymerized at reservoir 20 and in turn to gate 18 will avoid the formation of unacceptable bubbles and voids. Since monomers generally have a relatively low viscosity, they will flow easily through gate 18 into cavity 16 to fill the volume lost to shrinkage of the reacting mixture.

In the present invention the reaction mixture which is contained in reservoir 20 is constantly resupplied to cavity 16 through gate 18 thus as polymerization occurs at the lower end or closed end 26 of mold 10 the shrinkage that occurs and would eventually appear as a void 30 as shown in FIG. 4 is immediately replenished by the reaction mixture or mixture of polymers contained in reservoir 20. It is of course understood that the reaction mixture is highly mobile and flows readily to fill the volume lost due to shrinkage of the part of the mixture that has already undergone reaction. The instantaneous replacement of the space formed by shrinkage by unreacted material ensures a final piece that is defect free and distortionless. The movement of the energy source 22 relative to the mold body 10 must, of necessity, start with opening 23 in focusing gate 24 moving from closed end 26 to gate 18 in a manner such that polymerization takes place at a steady rate from the closed end to the gate end.

In the event the source of energy 22 is by the nature of the monomer a heat source, movement of the focusing gate across the mold body 10 must be at a rate that does not permit heat transmission through second part 14 at a rate faster than polymerization is taking place. That is, as the heat source of energy 22 moves upwardly, second part 14 will absorb heat and conduct that heat inwardly to cavity 16 where polymerization takes place. The portion of second part 14 above opening 23 must be kept cool which may be accomplished by circulating a cooling fluid through passages 34 so that the upper portion of part 14 remains cool in relation to the lower portion of part 14 thereby providing differential heating of mold cavity 16. Similar cooling passages may be appropriate in the upper portion of part 12 (not shown).

Referring specifically to FIGS. 1 and 2, the exemplary molded body 36 shown therein is a convex-convex lens.

Figure 3:
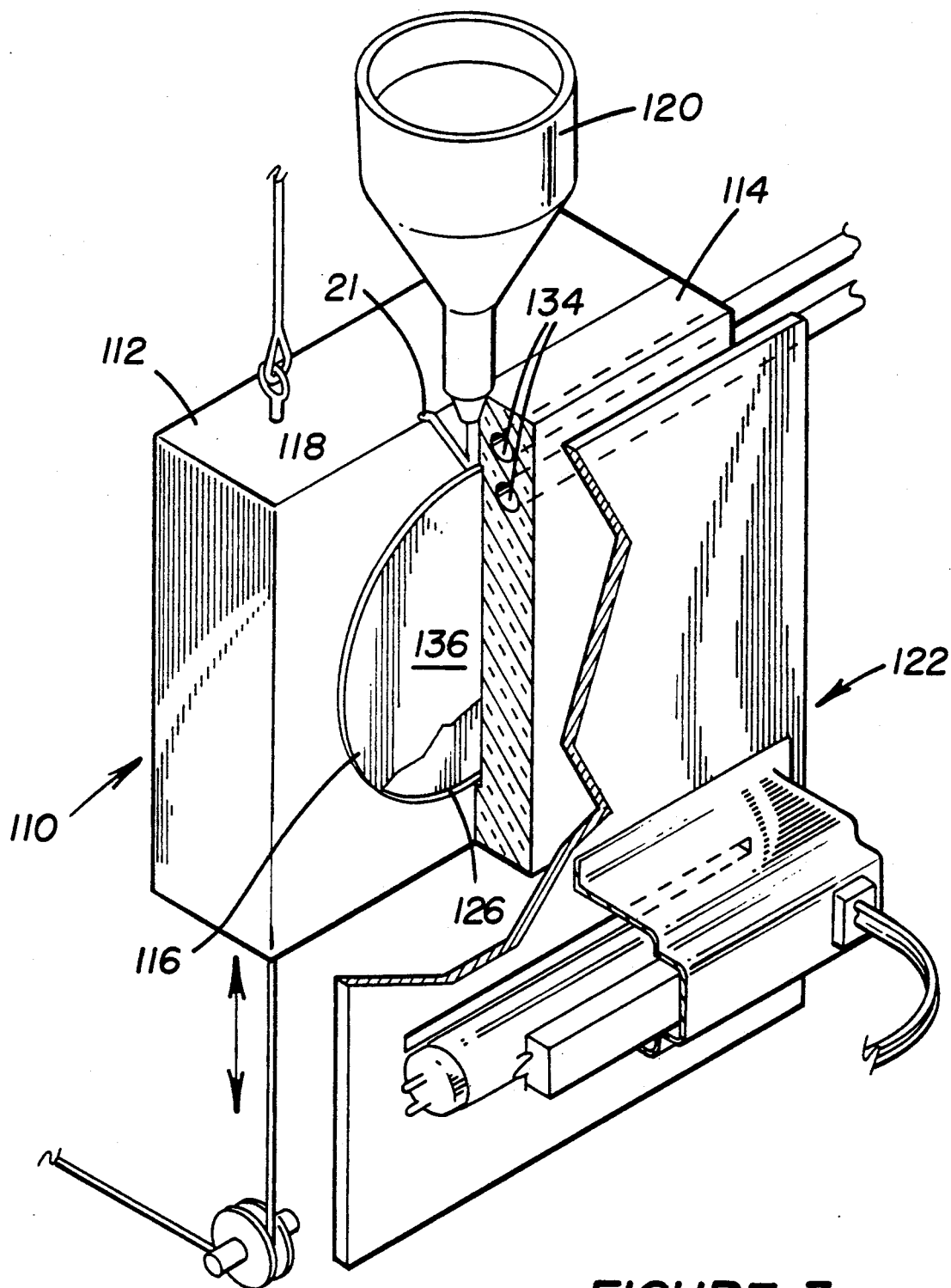
FIG. 3 is an alternate embodiment of the mold body shown in FIG. 1.

Referring to the alternate embodiment in FIG. 3, wherein the energy source 122 is fixed and the mold body 110 is movable relative to the source of energy, a different type of exemplary cavity 116 is illustrated. The cavity 116 is a flat, disc-like cavity which is appropriate for optical or magnetic discs utilized currently in recording of music and the like and for storage of data in computerized systems. Currently, these optical or magnetic discs are injection molded which imparts residual stresses yielding a product that may warp with time. Birefringence, which occurs in injection molded optical data recording substrate is also highly undesirable. Here again, the reaction mixture is provided to cavity 116 through gate 118 as a continuous source avoiding the stresses inherent in injection molding. (In injection molding processes, the material provided to the mold cavity is generally thermoplastic with a high distortion temperature that has already been polymerized then pelletized and melted. The injection molding takes place under extremely high pressure, followed by relatively fast cooling with almost an assurance of inherently unacceptable residual stress for the manufacture of optical or magnetic discs.)

In FIG. 3, the mold body 110 with its first part 112 and second part 114 transparent to source of energy 122, is moved relative to source of energy 122 with polymerization occurring first at the closed end 126 and moving across cavity 116 to gate 118 by the relative movement of the source of energy and the mold body. Here again, second part 114 is transparent to the source of energy be it heat or a particular type of light. In situ polymerization in this instance may be more adaptable to heat triggered reaction as the control of the incidence of heat upon the cavity 116 where the molded body 136 is of a uniform thickness is more readily controlled. Here again the unreacted mixture contained in reservoir 120 communicates with cavity 116 through gate 118 to fill the volume lost due to reaction shrinkage thereby compensating for any shrinkage in the disc. The final product is a perfectly shaped disc with all portions in a stress free state and free of any internal voids. It lacks birefringence and residual distortion and is dimensionally exact to the degree provided in cavity 116.

This method of preparation of precision molded polymeric parts applies to all monomers, monomer mixtures, and monomer/cross linker mixtures. As result, this method permits the broadest selection of the reaction chemistry to achieve precision parts with the required mechanical, thermal, optical, tribological, magnetic, moisture sensitivity and dielectrical properties. The list of monomers, monomer mixtures and monomer/crosslinkers thus would embrace all such materials known or new monomers to be synthesized.

Alternatively, as already noted, cavity 116 can be in any shape capable of being used as a mold. The advantage to differential polymerization is that one obtains precision parts that are stress free and flawless.

Figure 5:
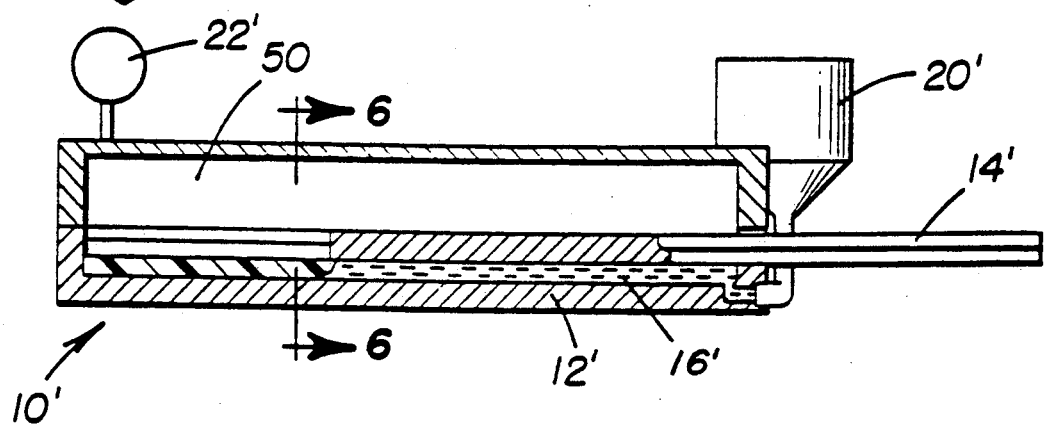
FIG. 5 is a mold body for in situ devolatilization or coagulation of a polymer in a differential manner.
Figure 6:
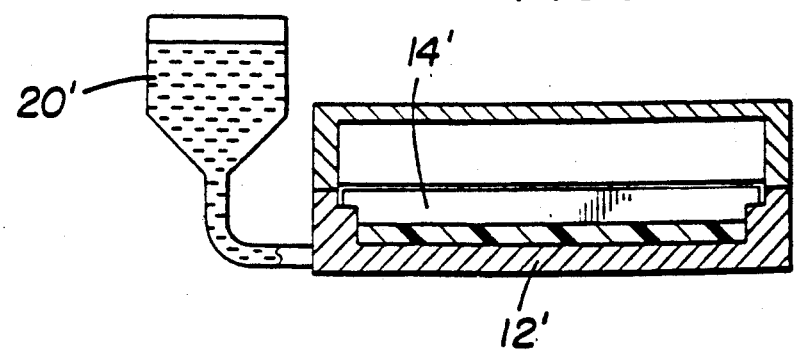
FIG. 6 is a cross-sectional view of the mold body shown in FIG. 5 at cut-line 6—6.

Referring now to FIG. 5 a device for solidification of a liquefied polymer mixture by the application of a solidifier is shown. As in the embodiment just discussed a mold structure 10' is utilized in this embodiment. Mold structure 10' has a first part 12, and a second part 14' with second part 14' being slidably removable from the first part 12'. In this embodiment a liquefied polymer mixture, that consists of a solid polymer and perhaps other fillers that have been dissolved in a solvent is contained in reservoir 20, which is in communication with cavity 16'. Cavity 16' is filled with the liquefied polymer when second part 14' fully closes cavity 16'. In the mold structure shown in FIG. 5 a flat plate like structure or sheet will be the result of the casting process. Should drying or devolatilization take place simultaneously over the entire flat plate or sheet, the sheet will warp or crack as shrinkage occurs due to solvent evaporation. Equivalently, when a nonsolvent extractant is used to leach out the solvent as in coagulation, a certain degree of shrinkage will result depending on the relative rates of solvent leaving the mixture and nonsolvent entering the mixture. If, however, second part 14' is withdrawn slowly from the mold body 10' so that devolatilization and/or coagulation can occur in a differential manner such as described above with the polymerization process, then the dissolved polymer feed contained in reservoir 20 can flow into the mold cavity 16' to fill the spaces that occur because of the shrinkage. While shrinkage may not be as great in the devolatilization or coagulation of a liquefied polymer as in polymerization, it is sufficiently significant that cracking will occur in the finished sheet. Should it be necessary to evacuate the space above mold cavity 16' or to use some atmosphere other than ambient air or to use a liquid nonsolvent or nonsolvent vapor, a vacuum pump or source of solidifier 22' may be affixed to a chamber that surrounds the mold body 10'.

Figure 7:
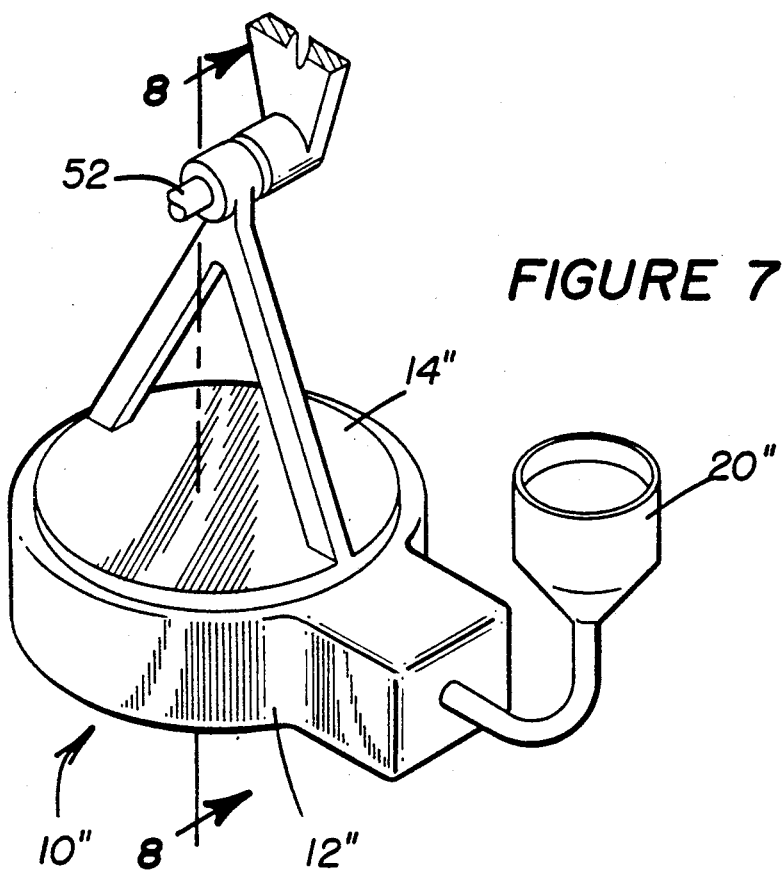
FIG. 7 is a device for molding curved bodies through devolatilization.

Referring now to FIG. 7, a schematic is shown for a device used for devolatilization of a liquid polymer to form a curved part. In particular mold body 10" is formed with a first part 12" and second part 14" (See FIG. 8) forming a curved cavity 16". In this particular embodiment second part 14" swings from an axle or pivot point 52 to differentially expose mold cavity 16" to an evaporating atmosphere. The reservoir 20" is filled with a liquefied polymer and communicates through a conduit 54 with a gate 56 to ensure that mold cavity 16" is continuously filled with liquefied polymer. The liquefied polymer may be subsequently devolatilized by the withdrawal of second part 14" in a sequential or differential manner as described above.

It should be understood that application of this invention to any shape or mold to form precision parts by either in situ polymerization or devolatilization or coagulation of a pre-solidified polymer feed is limited only to the extent of the capacity of the mold maker. For example, it is specifically addressed toward but not restricted to precision parts such as lenses and compact discs, and lightweight structural parts that require precision molding and must be stress free.

OPERATION OF THE EMBODIMENTS

Operation of the aforedescribed invention should be clear to those skilled in the art, however, a brief review is offered for consideration.

Referring to FIG. 1, the mold 10 is clamped together in a conventional manner with reservoir 20 in the position shown. Reservoir 20 is filled with the reacting mixture in this case a monomer, a mixture of monomers or a monomer/crosslinker mixture loaded with an initiator and/or other catalysts, such that the material will easily flow into cavity 16. It is important to ensure that cavity 16 is fully filled with the reacting mixture before polymerization is attempted. Accordingly it may be appropriate to provide a vent 21 to the mold cavity 16. In the event a vent is employed, it should be closed and plugged before polymerization takes place. Closing the vent will assist in drawing additional reaction mixture into cavity 16 during polymerization rather than permitting air to enter the mold.

Once mold cavity 16 is filled, the source of energy 22 may be activated and focusing gate 24 moved relative to mold body 10 thereby imposing either heat or light, as appropriate, to the mold body in a differential manner. Should heat be the source of energy, then it may be appropriate to activate cooling passages 34 at the upper end of the mold body to ensure that heat conduction through the mold body will not initiate polymerization in the upper portion of the mold before the focusing gate 24 traverses the entire face of the mold.

Once focusing gate 24 has completed its passage and polymerization is complete in the mold body 10, then the mold structure can be taken apart and the molded precision part removed.

Operation of the embodiment shown in FIG. 3 follows the same pattern as that described above and will not further be described herewith.

Figure 8:
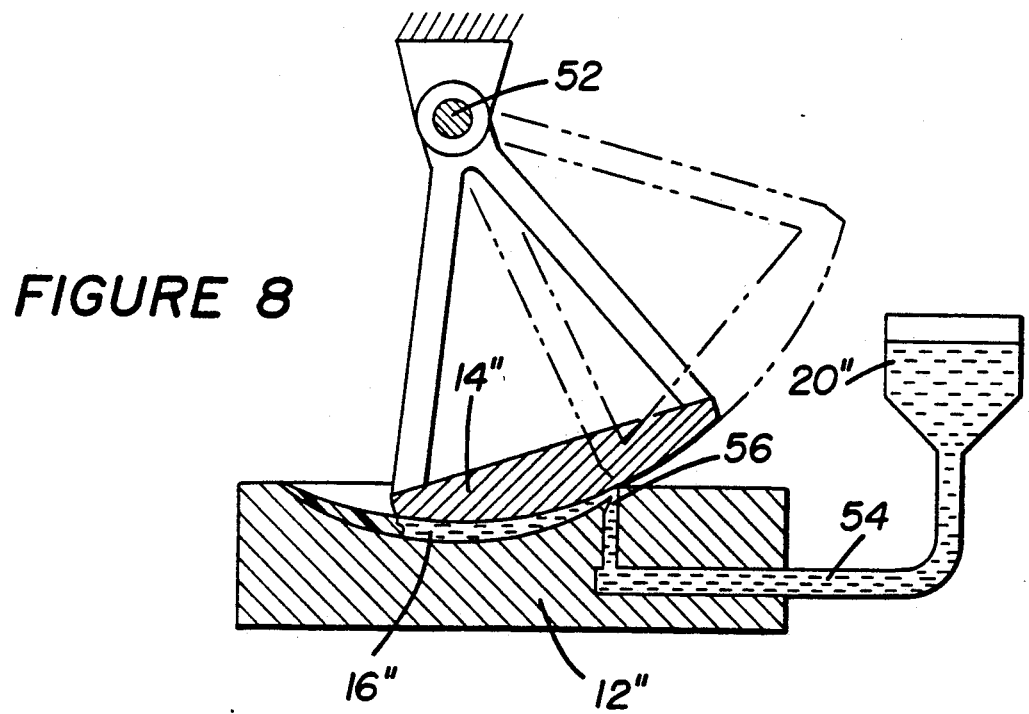
FIG. 8 is a cross-sectional view of the embodiment shown in FIG. 7 wherein the cut-line in FIG. 7 is at 8—8.

In the devolatilization or coagulation differential casting process shown in FIGS. 5, 6, 7, and 8, the liquefied polymer mixture contained in reservoir 20' or 20'' is allowed to flow into the mold space 16' or 16'' as appropriate and completely fill the mold cavity. Once the mold cavity is completely filled, then withdrawal of the second part 14' to expose the liquefied polymer differentially to the solidifying atmosphere or nonsolvent may be accomplished. The rate of removal of the second part 14' is dependent upon the liquefied polymer to be solidified. This of course will vary with the different materials utilized and in part may be dependent upon the thickness of the material. In FIGS. 7 and 8, the same procedure is followed except that the second part 14'' is swung away sequentially to form a curved shape as indicated.

While this invention has been described in relation to certain embodiments, it is not to be so limited, rather, it is limited only to the extent of the appended claims.

What is claimed is:

1. A method of forming an article of precise dimensions by solidification in a precisely dimensioned mold of a liquefied material comprising at least one monomer, prepolymer or polymer, that, upon exposure to a solidifying source of electromagnetic radiation, shrinks; the method comprising the steps of:
   a. providing a mold body having a first part and a second part, said first and second parts defining an internal cavity therebetween, the cavity corresponding to the precise dimensions of the finished article and having a closed end and an open end, at least one of said first or the second parts formed to permit exposure of the liquefied material to the electromagnetic source in the internal cavity in a differential and sequential manner;
   b. providing the electromagnetic source for imposition through a focusing gate upon the surface of the liquefied material to the electromagnetic source in the internal cavity in a differential and sequential manner;
   c. providing a source of the liquefied material at said open end of said mold body;
   d. filling the internal cavity with the liquefied material;
   e. differentially exposing said liquefied material to said electromagnetic source through the focusing gate by moving the source relative to the mold body starting at said closed end and proceeding to the open end while continuously supplying liquefied material to said open end so that polymerization takes place at a controlled rate from the closed end to the open end; and
   f. removing the resultant solidified article from the cavity.

2. The method of claim 1 wherein the solidifying electromagnetic source is a heat source.

3. A method of polymerization of a reaction mixture within a precisely dimensioned mold to form an article by imposition of a form of energy on the reaction mixture, the method comprising the following steps:
   a. providing a mold body of at least two parts and having at least a portion thereof permeable to the form of energy, the mold defining an internal cavity having a closed first end and a second end, said cavity conforming to the outer dimensions of the article, and the mold body further defining a gate at said second end of said internal cavity;
   b. providing a source of the form of energy for permeating a defined localized area of the permeable portion of the mold body;
   c. providing a source of reaction mixture capable of being polymerized by the imposition of a form of energy;
   d. filling the internal cavity with the reaction mixture;
   e. differentially exposing said reaction mixture, by localized portions through a focusing gate, to the one form of energy starting at the first end of said internal cavity and proceeding on a timed sequence basis to the second, gated end whereby the reaction mixture is polymerized from the first end to the second, gated end at a controlled rate; and
   f. removing the resultant polymerized article from the cavity.

4. The method of claim 3 further including the step of providing a source of heat to act as the one form of energy.

5. The method of claim 3 further including the step of providing a source of electromagnetic radiation as the one form of energy.

6. The method of claim 3 wherein the step of exposing differentially the reaction mixture to the one form of energy includes the step of moving the mold and the source of energy relative to one another.

7. The method of claim 3 wherein the step of providing a source of energy includes a step of providing a source energy so that the energy radiates from the source generally in a plane that is perpendicular to the relative movement of the mold and the source of energy.

* * * * *